United States Patent
Augsburger et al.

(10) Patent No.: US 10,539,339 B2
(45) Date of Patent: Jan. 21, 2020

(54) SOLAR RECEIVER HAVING IMPROVED HELIOSTAT FIELD PERFORMANCE

(71) Applicant: General Electric Technology GmbH, Baden (CH)

(72) Inventors: Germain Felicien Augsburger, Zurich (CH); Apurba Kumar Das, Vernon, CT (US); Pedro Inigo, South Windsor, CT (US); John David McGrane, Windsor, CT (US); Sunil Satyanarayana Murthy, Manchester, CT (US)

(73) Assignee: General Electric Technology GmbH, Baden (CH)

( * ) Notice: Subject to any disclaimer, the term of this patent is extended or adjusted under 35 U.S.C. 154(b) by 455 days.

(21) Appl. No.: 15/182,931

(22) Filed: Jun. 15, 2016

(65) Prior Publication Data
US 2017/0363329 A1    Dec. 21, 2017

(51) Int. Cl.
| F24S 10/70 | (2018.01) |
| F24S 10/25 | (2018.01) |
| F24S 50/20 | (2018.01) |
| F24S 23/70 | (2018.01) |
| F24S 20/00 | (2018.01) |

(52) U.S. Cl.
CPC .............. *F24S 10/72* (2018.05); *F24S 10/25* (2018.05); *F24S 23/70* (2018.05); *F24S 50/20* (2018.05); *F24S 2020/11* (2018.05); *F24S 2023/878* (2018.05)

(58) Field of Classification Search
None
See application file for complete search history.

(56) References Cited

U.S. PATENT DOCUMENTS

| 1,915,807 A | * | 6/1933 | Thomsen, Sr. | .......... F22B 17/16 122/279 |
| 2,237,617 A | * | 4/1941 | Trede | ........................ F22B 1/12 165/140 |
| 2,867,416 A | * | 1/1959 | Lieberherr | .............. F22B 29/06 122/235.11 |
| 3,893,507 A | * | 7/1975 | MacCracken | ............. F25C 3/02 165/46 |
| 4,269,172 A | * | 5/1981 | Parker | ..................... F24S 10/73 126/621 |

(Continued)

OTHER PUBLICATIONS

Kolb, An Evaluation of Possible Next-Generation High-Temperature Molten-Salt Power Towers, Sandia National Laboratories, Sandia Report, SAND2011-9320, Dec. 2011, pp. 1-121.

(Continued)

*Primary Examiner* — Avinash A Savani
*Assistant Examiner* — Martha M Becton
(74) *Attorney, Agent, or Firm* — Dority & Manning, P.A.

(57) ABSTRACT

The present disclosure is directed to a solar receiver having improved heliostat field control. The solar receiver includes a plurality of receiver panels arranged adjacent to one another. Each receiver panel includes a plurality of receiver tubes aligned tangentially to one another. Further, each of the plurality of receiver tubes includes an inlet and an outlet. In addition, at least one of the inlets or outlets of the plurality of receiver tubes are arranged at a center of the receiver panel along a height thereof.

14 Claims, 12 Drawing Sheets

(56) References Cited

U.S. PATENT DOCUMENTS

| | | | |
|---|---|---|---|
| 4,474,173 A * | 10/1984 | Ford | F24S 23/80 |
| | | | 126/676 |
| 4,535,755 A * | 8/1985 | Roberts | F24S 10/45 |
| | | | 126/656 |
| 5,862,800 A | 1/1999 | Marko | |
| 6,701,711 B1 | 3/2004 | Litwin | |
| 6,931,851 B2 | 8/2005 | Litwin | |
| 8,063,349 B2 | 11/2011 | Huss et al. | |
| 8,327,840 B2 | 12/2012 | Gilon et al. | |
| 8,365,529 B2 | 2/2013 | Litwin et al. | |
| 8,517,008 B2 * | 8/2013 | Plotkin | F24S 10/742 |
| | | | 126/663 |
| 8,869,530 B2 * | 10/2014 | Dethier | F22B 1/006 |
| | | | 60/641.8 |
| 9,182,149 B2 | 11/2015 | Navio Gilaberte et al. | |
| 9,194,609 B2 * | 11/2015 | Iannacchione | F22B 1/006 |
| 9,765,992 B2 * | 9/2017 | Das | F24S 20/20 |
| 2004/0035111 A1 * | 2/2004 | Ven | F22B 1/006 |
| | | | 60/641.8 |
| 2010/0101564 A1 * | 4/2010 | Iannacchione | F22B 1/006 |
| | | | 126/680 |
| 2010/0258112 A1 | 10/2010 | Viskup, Jr. et al. | |
| 2011/0289921 A1 * | 12/2011 | Dethier | F22B 1/006 |
| | | | 60/641.8 |
| 2012/0131941 A1 * | 5/2012 | Ackner | F24S 60/30 |
| | | | 62/235.1 |
| 2012/0304982 A1 * | 12/2012 | Plotkin | F24J 2/07 |
| | | | 126/663 |
| 2013/0192856 A1 | 8/2013 | Wasyluk et al. | |
| 2015/0176863 A1 * | 6/2015 | Das | F24S 20/20 |
| | | | 126/714 |

OTHER PUBLICATIONS

Zavoico, Solar Power Tower Design Basis Document Revision 0, Sandia National Laboratories, SAND2001-2100, Jul. 2001, pp. 1-148.

Rodriguez-Sanchez, et al., Thermal design guidelines of solar power towers, Applied Thermal Engineering 63, 2014, pp. 428-438.

Rodriguez-Sanchez, et al., New designs of Molten-salt Tubular-receiver for solar power tower, Science Direct, Energy Procedia 49, 2014, pp. 504-513.

Stoke, Renewable Energy Solar Two Central Receiver, Consultant Report California Energy Commission, Oct. 1999, pp. 1-232.

Lata, et al., High Flux Central Receivers of Molten Salts for the New Generation of Commercial Stand-Alone Solar Power Plants, Journal of Solar Energy Engineering, vol. 130, May 2008, pp. 021002-1 to 021002-5.

International Search Report and Written Opinion issued in connection with corresponding PCT Application No. PCT/EP2017/064602 dated Aug. 8, 2017.

* cited by examiner

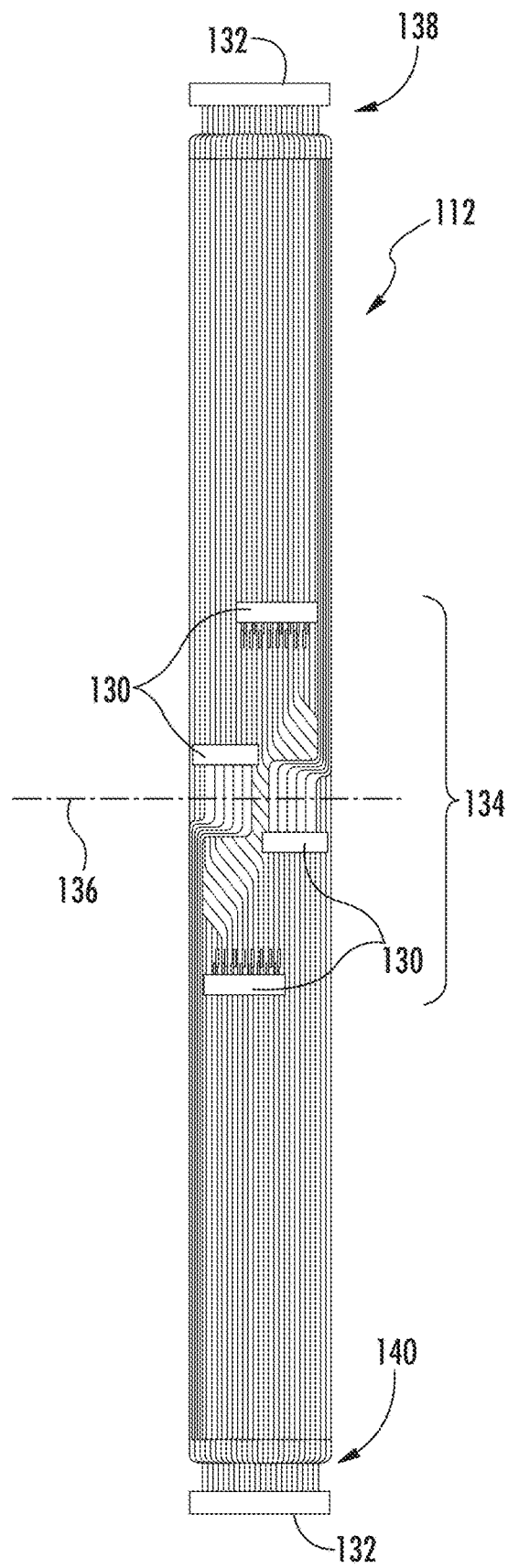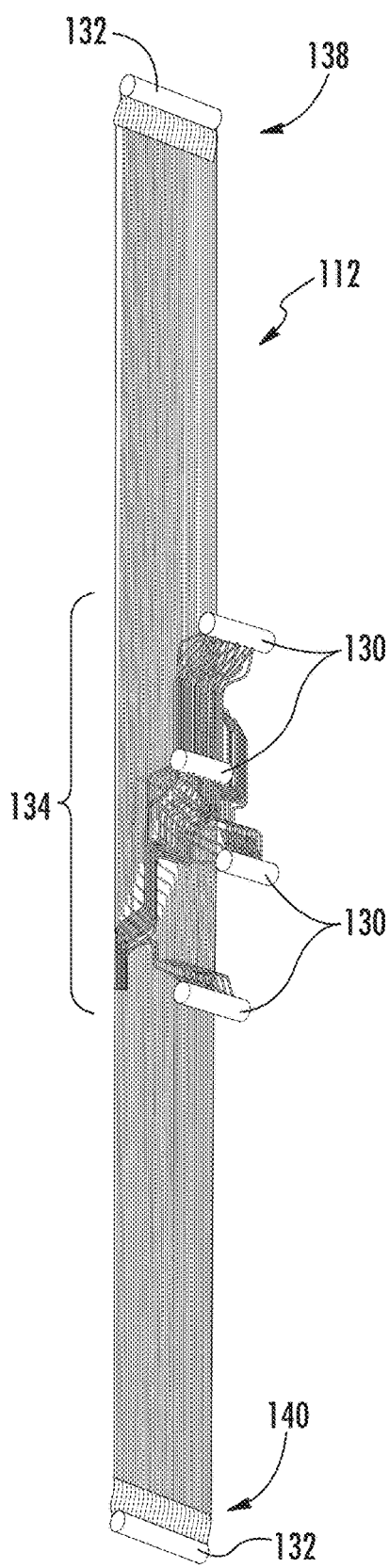
FIG. 9
FIG. 10

SOLAR RECEIVER HAVING IMPROVED HELIOSTAT FIELD PERFORMANCE

FIELD OF THE INVENTION

The present invention relates generally to solar power plants, and more particularly, to a solar receiver constructed of center-fed receiver panels for improved mirror field performance.

BACKGROUND OF THE INVENTION

Solar power is considered one of the cleanest, most environmentally friendly energy sources presently available, and solar power plants have gained increased attention in this regard. A concentrated solar power plant uses a solar receiver (e.g. steam/molten salt) located at an elevation of a support tower. Thus, solar rays are focused on the panels of the solar receiver via a heliostat field for utilizing the solar heat to produce electricity.

More specifically, the receiver panels of the solar receiver generally include receiver tubes carrying various fluids that are heated by focusing sunrays thereon (i.e. via the heliostat field), thereby heating fluid to be utilized for producing electricity. The easiest and most effective way to focus solar energy using a heliostat field to the receiver panels is to direct the heliostats or mirrors of the heliostat field at the centerline of the solar receiver surface along a height thereof. For example, FIG. 1 illustrates a heat flux profile applied on a solar receiver panel surface 10 with centerline 12 aiming.

The geometric arrangement of the solar receiver panel surface 10 along with the heat flux limit constraints for the surface, however, prevents such aiming of the heliostat field and thus limits the field performance. For example, a typical heat flux limit for the current arrangement is shown in FIG. 2. As shown, the heat flux limits of adjacent receiver tubes 14 at any given height turn out to be drastically different. Moreover, as shown, the conventional arrangement of the panel 10 is such that the inlets 18 and outlets 20 of the receiver tubes 14 are at the top and/or bottom of the solar receiver panel surface 10. As a result, (a) the heat flux limits decreases from one end of the passes to other along the height and (b) the heat flux limits of adjacent passes are largely different. In order to apply heat flux within the constraints as mentioned above, the spillage is high. Additionally, to maximize the opportunity to apply heat flux in line with the conventional arrangement, the heliostat field is required to adopt a more complicated multipoint aiming scheme, which can be complex and expensive.

While previously known solar receiver arrangements may have generally been considered satisfactory for their intended purposes, there remains a need in the art for solar receivers having receiver panels with a heat flux limit in line with centerline/center band aiming techniques without requiring a complicated multipoint aiming scheme of the heliostat field.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a solar receiver. The solar receiver includes a plurality of receiver panels arranged adjacent to one another. Each receiver panel includes a plurality of receiver tubes aligned tangentially to one another. Further, each of the plurality of receiver tubes includes an inlet and an outlet. In addition, at least one of the inlets or outlets of the plurality of receiver tubes are arranged at a center of the receiver panel along a height thereof.

In another embodiment, at least one of the inlets or outlets of the plurality of receiver tubes may be arranged towards an edge of the receiver panel.

Further, in certain embodiments, a flow direction of one or more of the inlets or outlets of the plurality of receiver tubes may converge at the center of the receiver panel along a height thereof. For example, in one embodiment, the flow direction of all of the inlets or all of the outlets of the plurality of receiver tubes may converge at the center of the receiver panel along a height thereof.

Alternatively, a flow direction of one or more of the inlets or outlets of the plurality of receiver tubes may diverge from the center of the receiver panel along a height thereof. For example, in one embodiment, the flow direction of all of the inlets may diverge from the center of the receiver panel along a height thereof or all of the outlets may diverge from the center of the receiver panel along a height thereof. In still further embodiments, the flow direction of some of the inlets or outlets may converge towards the center of the receiver panel and the flow direction of some of the inlets or outlets may diverge from the center of the receiver panel along a height thereof.

In additional embodiments, each receiver panel may include at least one inlet header configured with the inlet(s) of the plurality of receiver tubes and at least one outlet header configured with the outlet(s) of the plurality of receiver tubes. As such, the inlet and outlet headers are configured to transfer a heat transfer medium or fluid through the receiver tubes as the fluid is heated.

More specifically, in certain embodiments, the inlet header(s) may be configured in a center portion of the receiver panel or at an end of the receiver panel, e.g. at opposing ends of the receiver panel. For example, in one embodiment, each receiver panel may include at least four inlet headers configured with the inlets of the plurality of receiver tubes, wherein each of the four inlet headers are configured in the center portion of the receiver panel. In further embodiments, the outlet header(s) may be configured in a center portion of the receiver panel or at an end of the receiver panel. For example, in one embodiment, each receiver panel may include at least two outlet headers configured with the outlets of the plurality of receiver tubes, wherein the two outlet headers are configured at opposing ends of the receiver panel.

Thus, in certain embodiments, the panel arrangement as described herein provides a heat flux limit for each of the receiver panels corresponding to a heat flux profile having centerband aiming.

In still additional embodiments, one or more of the plurality of receiver panels may be vent-able. Further, one or more of the plurality of receiver panels may be drainable. In addition, the plurality of receiver panels may provide a continuous receiver surface configured to correspond to heat flux limits of a panel having a centerband aiming configuration.

In another aspect, the present disclosure is directed to a center-fed receiver panel for a solar receiver. The receiver panel includes a plurality of receiver tubes coupled tangentially to one another. Each of the plurality of receiver tubes includes an inlet and an outlet. Further, at least one of the inlets or outlets of the plurality of receiver tubes are arranged at a center of the receiver panel along a height thereof. It should be understood that the receiver panel may be further configured with any of the additional features as described herein.

In yet another aspect, the present disclosure is directed to a receiver panel for a solar power plant. The solar power plant includes a solar receiver having a plurality of receiver panels arranged adjacent to one another. Each receiver panel includes a plurality of receiver tubes coupled tangentially to one another. Further, each of the plurality of receiver tubes includes an inlet and an outlet. In addition, wherein at least one of the inlets or outlets of the plurality of receiver tubes are arranged at a center of the receiver panel along a height thereof. The solar power plant also includes a heliostat field having a plurality of heliostats configured to continuously reflect solar rays towards the plurality of receiver panels. As such, due to the tube arrangement of the panel, a heat flux limit of each of the plurality of receiver panels corresponds to a heat flux profile having centerband aiming. It should be understood that the solar power plant may be further configured with any of the additional features as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 9 illustrates a back view of the receiver panel of FIG. 7;

FIG. 10 illustrates a perspective view of the receiver panel of FIG. 7;

DETAILED DESCRIPTION OF THE INVENTION

Figure 1:
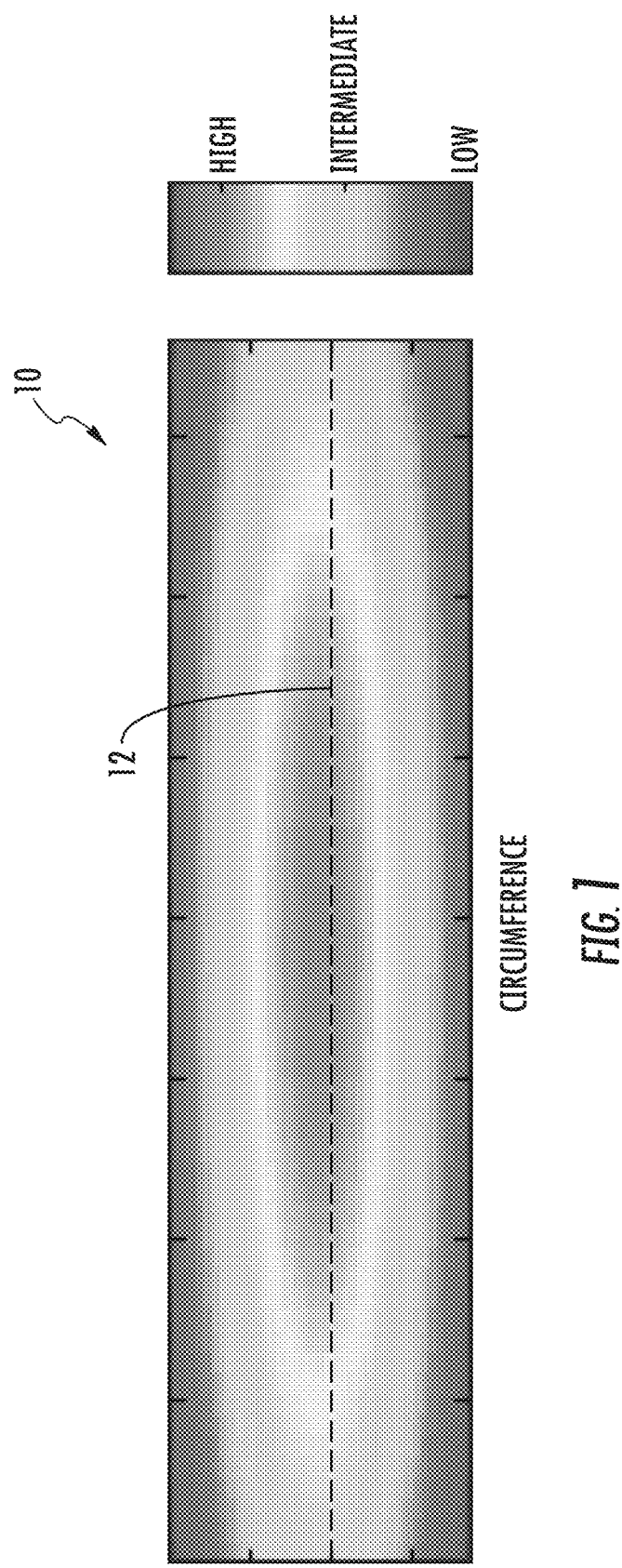
FIG. 1 illustrates a schematic view of one embodiment of a heat flux profile applied on a receiver panel surface of a solar receiver with centerband aiming.
Figure 2:
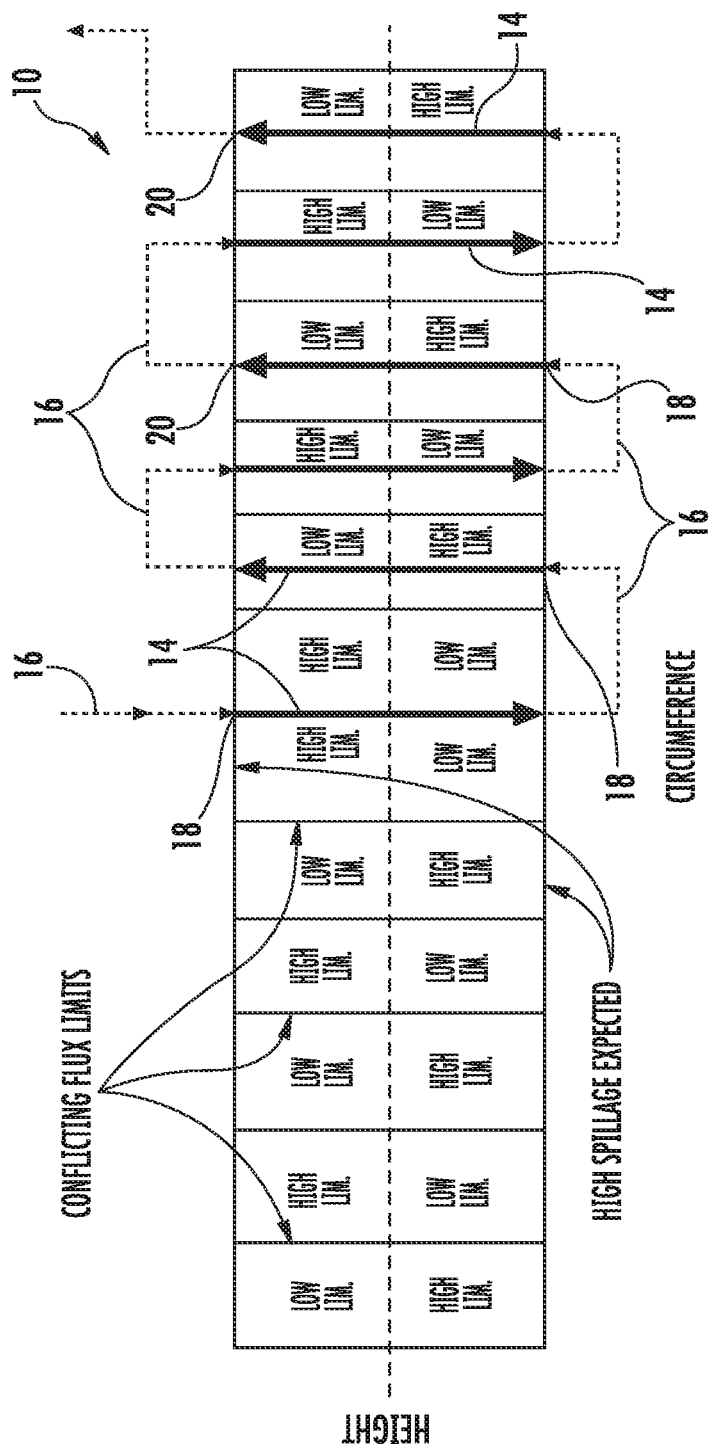
FIG. 2 illustrates a schematic view of one embodiment of a flow path through a plurality of receiver tubes of a solar receiver panel according to the conventional construction.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to a center-fed receiver panel for a solar receiver. As mentioned, the receiver panel includes a plurality of receiver tubes aligned tangentially to one another. Further, each of the plurality of receiver tubes includes an inlet and an outlet. Moreover, at least one of the inlets or outlets of the plurality of receiver tubes are arranged at a center of the receiver panel along a height thereof.

The present disclosure provides many advantages not present in the prior art. For example, the solar receiver of the present disclosure provides easier control of the heliostat field, as well as simpler aiming strategies to achieve a heat flux limit in line with centerline/center band aiming. Further, as the spillage flux can be reduced by adopting such aiming strategy, the solar receiver of the present disclosure allows for a smaller heliostat field for the same power on the receiver. In addition, the solar receiver of the present disclosure allows for shorter receiver tubes that can be easier to source and supply. Alternatively, such arrangement can lead to larger receiver surfaces with higher thermal ratings without compromising other parameters such as the ideal height-to-diameter aspect ratio of the receiver for optimal aiming of the heliostat field, introduction of weld in the heat transfer zone, and/or a reasonable diameter of the tower to support the receiver. Moreover, the present disclosure reduces spillage at the top and the bottom of the solar receiver, thereby requiring less protective shielding. Further, the receiver panel of the present disclosure represents a fully functional process design with no high point (making the panel ventable) and no low point (making the panel drainable) in the panel surface. Thus, the solar receiver of the present disclosure provides a simplified, cost effective approach of achieving a heat flux limit in line with centerline/center band aiming.

Figure 3:
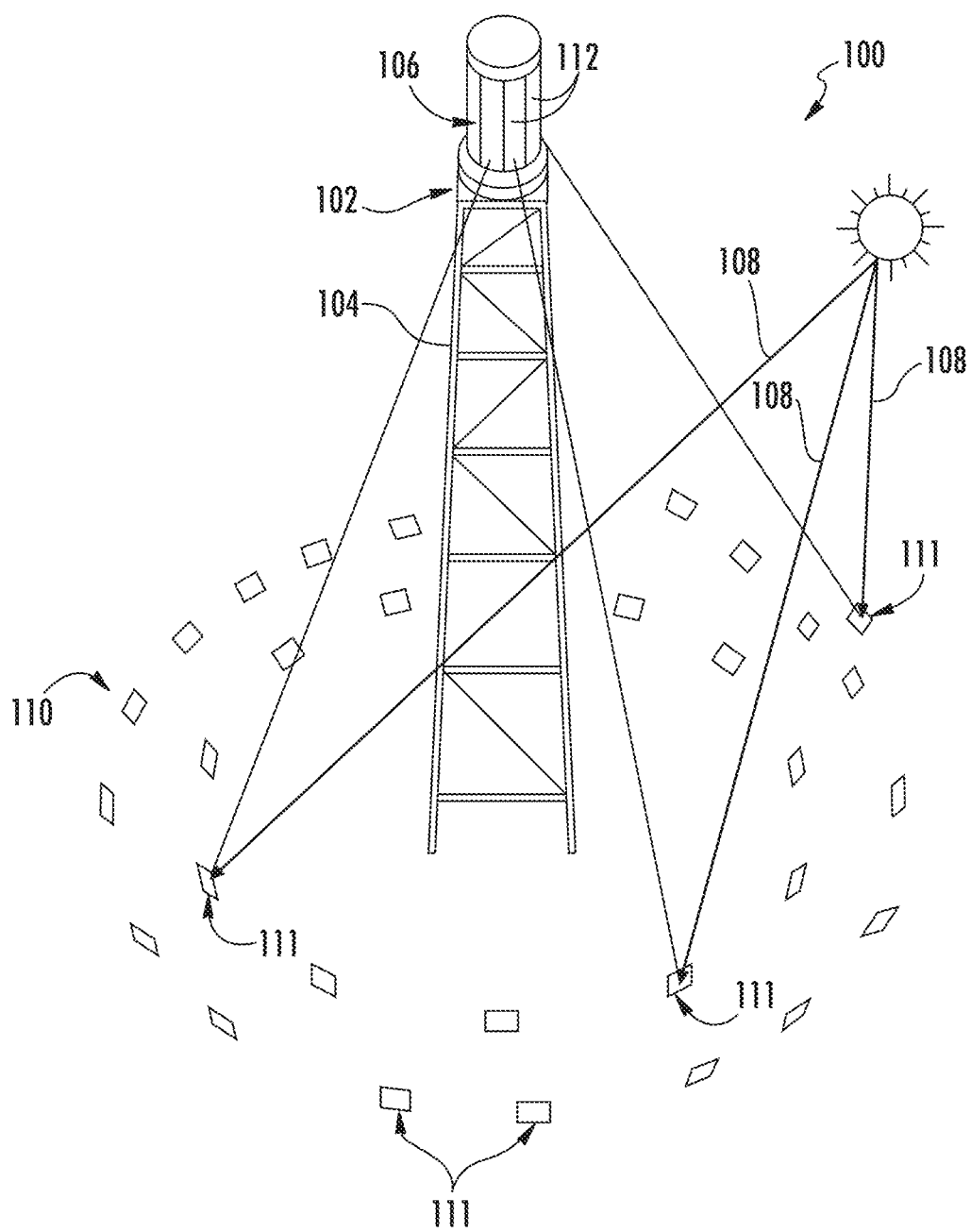
FIG. 3 illustrates a perspective view of one embodiment of a solar power plant according to the present disclosure.

Referring now to the drawings, FIG. 3 illustrates a perspective view of one embodiment of a solar power plant 100 according to the present disclosure. As shown, the solar power plant 100 includes a concentrated solar tower assembly 102 having a tower structure 104 and a solar receiver 106 secured at a top of the tower structure 104. As such, solar rays 108 are concentrated towards the solar receiver 106 via a heliostat field 110 having a plurality of heliostats 111 for the production of electricity. Heliostats 111 as used herein generally refer to any devices that include a reflective surface and which turn so to maintain reflecting solar rays 108 towards the solar receiver 106. As such, the heliostats 111 are configured to compensate for the sun's movement in the sky.

Figure 4:
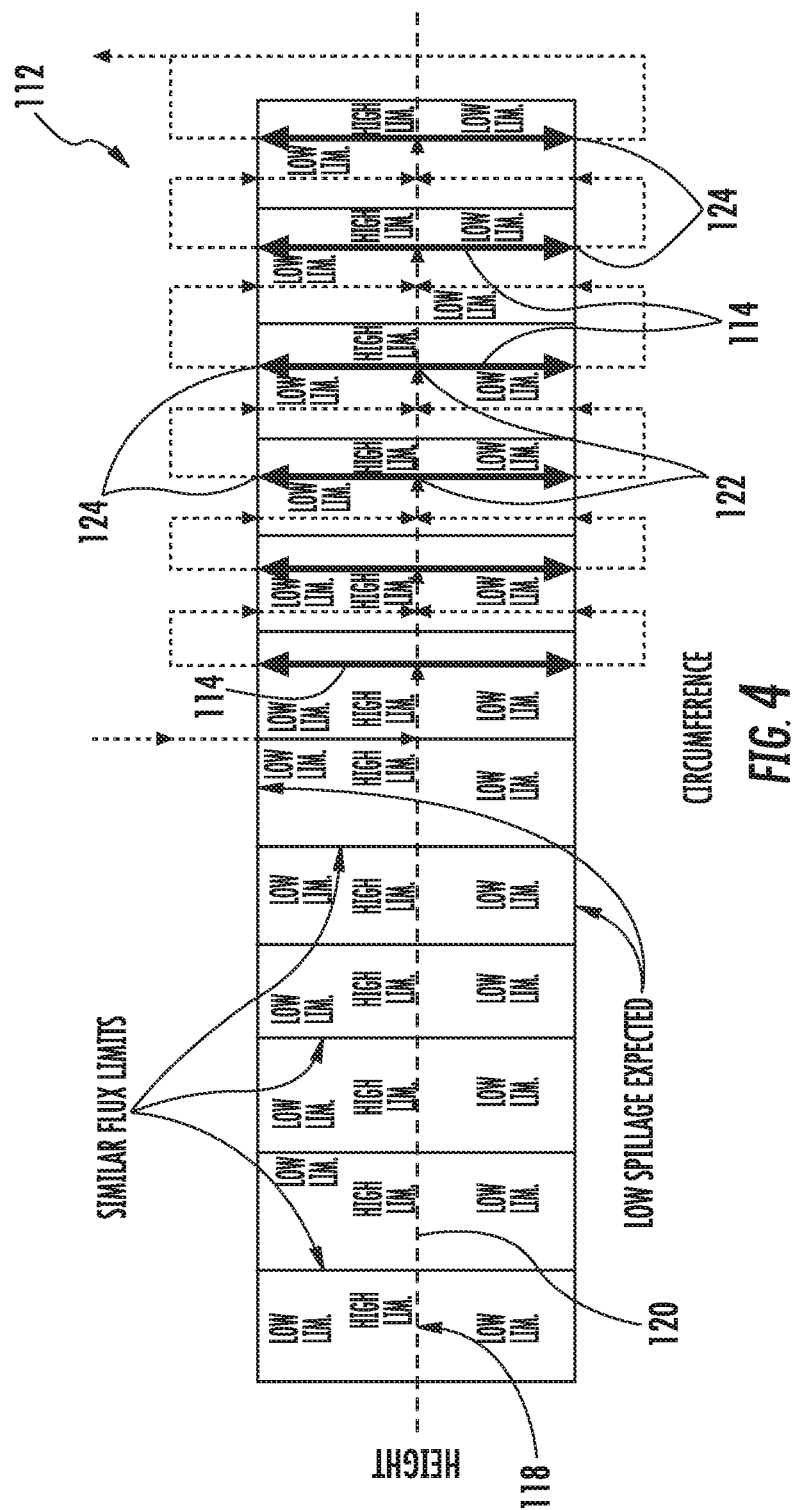
FIG. 4 illustrates a schematic view of one embodiment of a flow path through a plurality of receiver tubes of a solar receiver panel according to the present disclosure.
Figure 5:
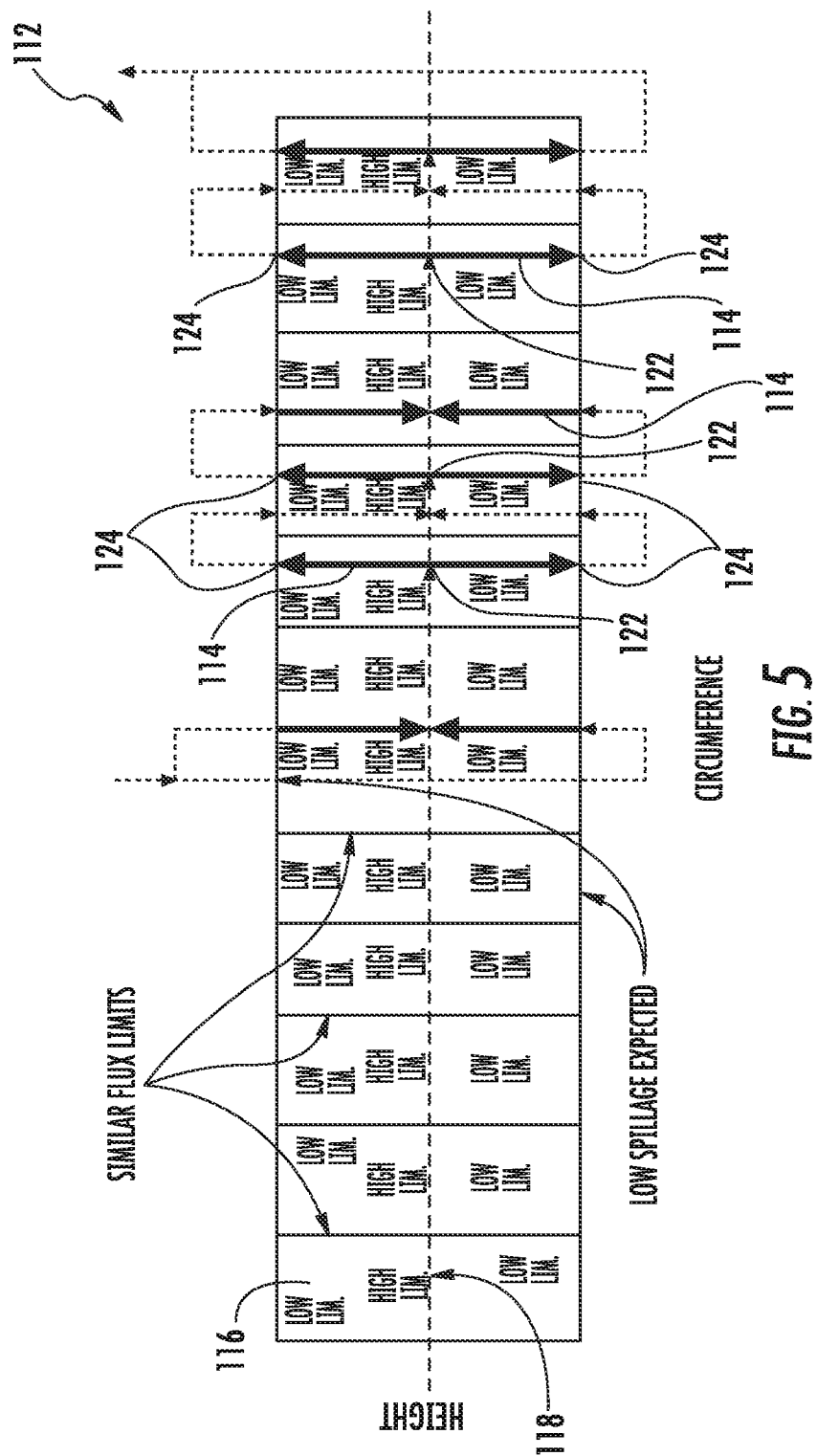
FIG. 5 illustrates a schematic view of another embodiment of a flow path through a plurality of receiver tubes of a solar receiver panel according to the present disclosure.
Figure 6:
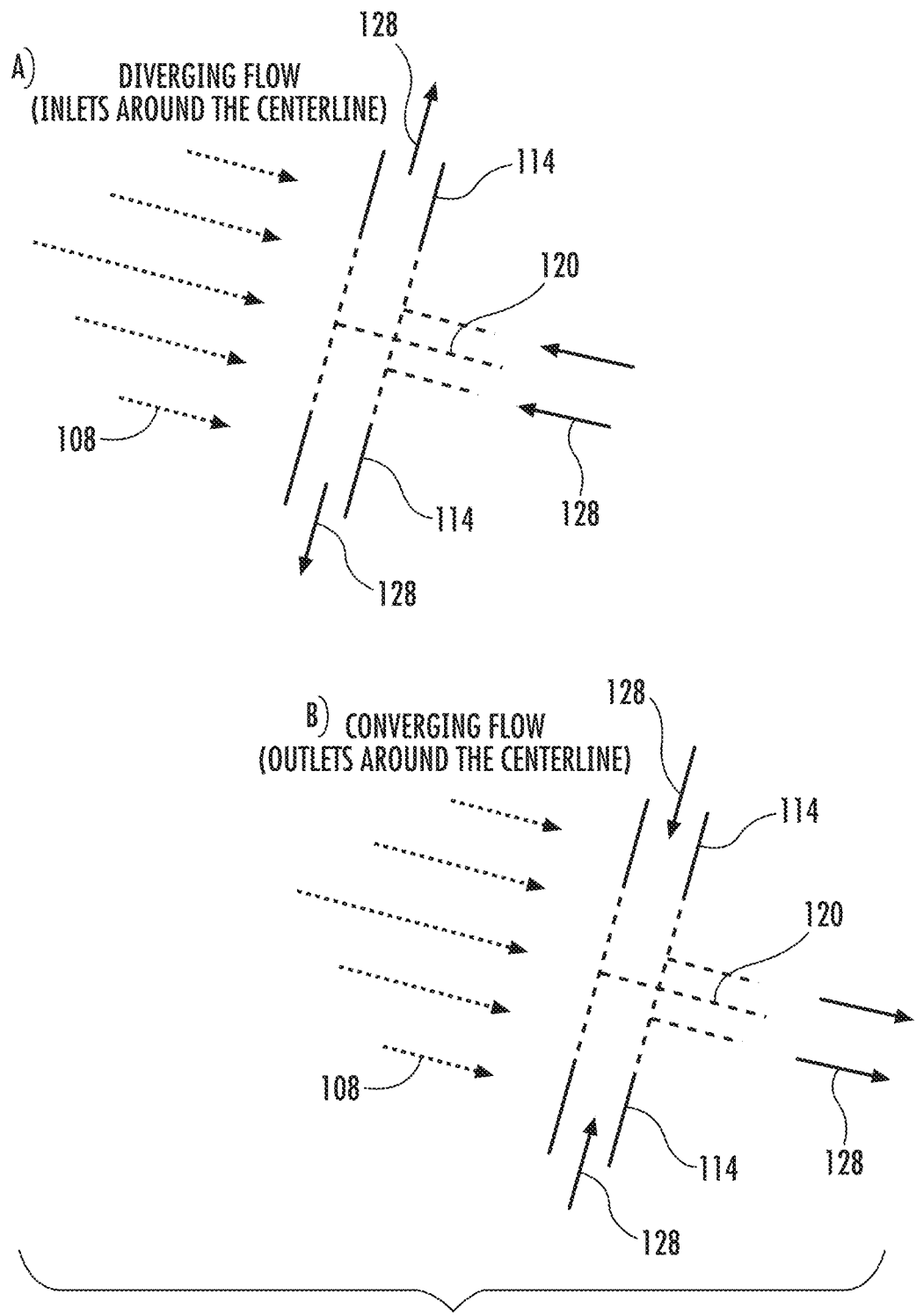
FIG. 6 illustrates a simplified, schematic diagram of one embodiment of a portion of a receiver panel surface of a solar receiver according to the present disclosure, particularly illustrating (A) a diverging flow path configured by an inlet around the centerline of the solar receiver and (B) a converging flow path configured by an outlet around the centerline of the solar receiver.
Figure 7:
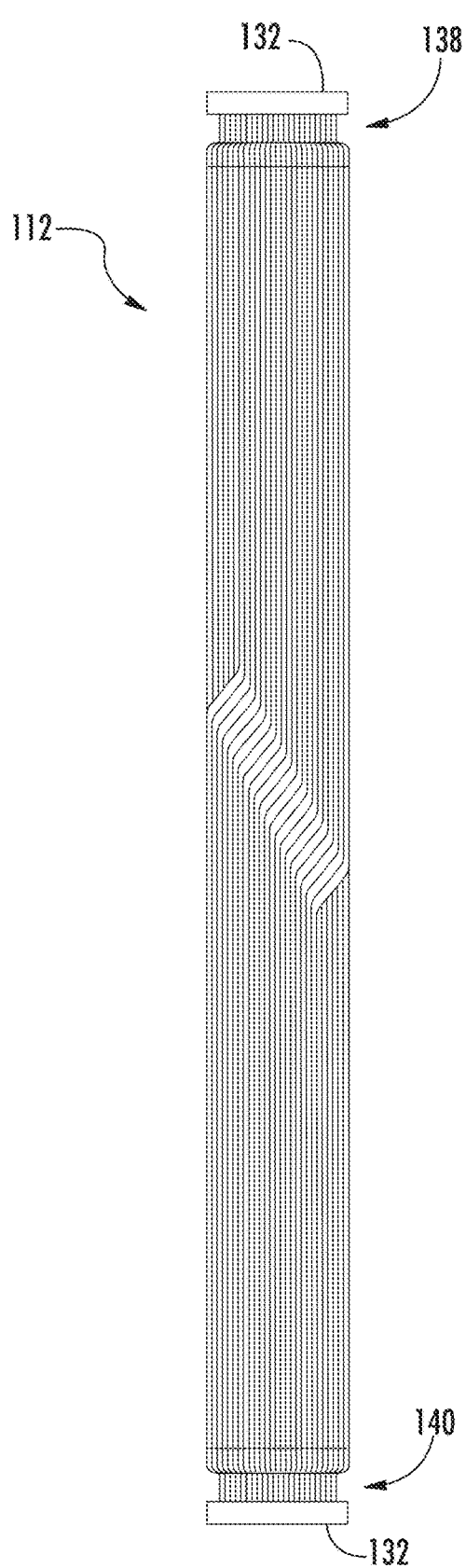
FIG. 7 illustrates a front view of one embodiment of a receiver panel of a solar receiver according to the present disclosure.
Figure 8:
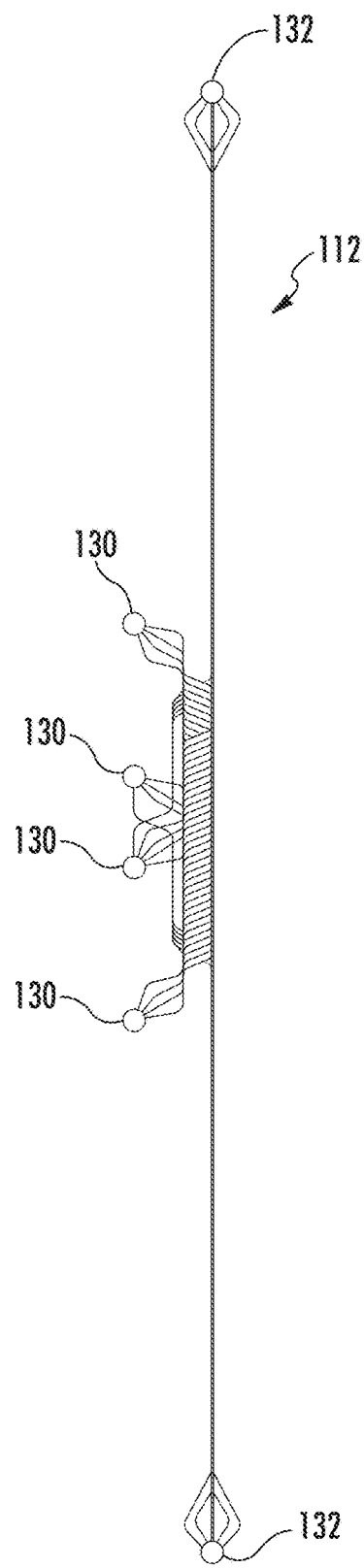
FIG. 8 illustrates a side view of the receiver panel of FIG. 7.
Figure 11:
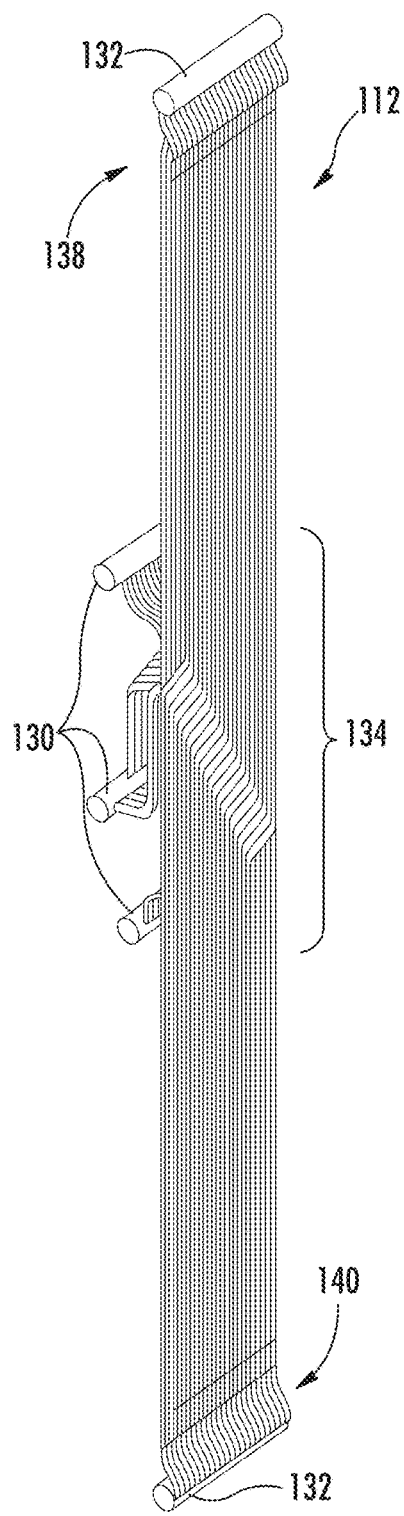
FIG. 11 illustrates another perspective view of the receiver panel of FIG. 7.

Further, as shown, the solar receiver 106 includes a plurality of receiver panels 112 arranged adjacent to one another, i.e. in a side-by-side configuration. Referring now to FIGS. 4, 5, and 7-15, each of the receiver panels 112 includes a plurality of receiver tubes 114 through which fluid flows for absorbing the solar heat applied on the receiver surface in the form of concentrated solar rays 108 by the heliostats 111. For example, as shown in FIGS. 4 and 5, various embodiments of a solar receiver surface 116 of the receiver panels 112 are illustrated, particularly depicting the heat flux limit profile applied on the surface 116 according to the present disclosure. Further, as shown, each of the receiver tubes 114 includes an inlet 122 and an outlet 124. Thus, as shown, to achieve a heat flux limit in line with the centerline 118 (or centerband) of the receiver panel 112, the inlets 122 of the plurality of receiver tubes 114 may be arranged at or around the center 120 of the receiver panel 112 along a height thereof. As shown in the illustrated embodiment of FIG. 4, the outlets 124 of the receiver tubes 114 may be configured at the top and/or bottom of the panel 112 and the inlets 122 of the receiver tubes 114 may be arranged around the center 120 of the panel 112. Thus, in such embodiments as shown in FIG. 6(A), the heat transfer medium or fluid 128 within the receiver tubes 114 is configured to flow away from or diverge from the center 120 of the panel 112. Further, a heat flux limit of each of the receiver panels 112 is configured to correspond to a heat flux profile having centerband aiming.

Alternatively, as shown in illustrated embodiment of FIG. 5, some of the inlets 122 and some of the outlets 124 of the receiver tubes 114 may be configured at the top and/or the bottom of the panel 112 and some of the outlets 124 may be arranged around the center 120 of the panel 112. Thus, as shown in FIG. 6(B), the heat transfer medium or fluid 128 within the receiver tubes 114 is configured to flow towards or converge at the center 120 of the panel 112 when heated, e.g. by the solar rays 108. Further, a heat flux limit of each of the receiver panels 112 is configured to correspond to a heat flux profile having centerband aiming.

Accordingly, the present disclosure provides a panel arrangement having a flow path of the heat transfer medium 128 to either diverge (center-feed) or converge (center-discharge) the flow around the centerline 120 of the panel, according to the heat flux limits of a given pass. More specifically, if the heat flux limit is decreasing with temperature, then the heat transfer medium 128 will diverge from the centerline 120 (center-fed), whereas if the heat flux limit is increasing with temperature, then the heat transfer medium 128 will converge to the centerline (center-discharge).

In additional embodiments, as shown in FIGS. 7-15, the receiver panel(s) 112 of the solar receiver 106 may include at least one inlet header 130 configured with the inlets 122 of the plurality of receiver tubes 114 and at least one outlet header 132 configured with the outlets 124 of the plurality of receiver tubes 114. More specifically, as shown particularly in FIGS. 8-12 and 14-15, the inlet header(s) 130 may be configured with a center portion 134 of the receiver panel 112. Alternatively, the inlet header(s) 130 may be configured with an end 132 of the receiver panel 112.

The center portion 134 (or centerband) of the receiver panel 112 as used herein generally encompasses the center 136 of the receiver panel 112 along a length thereof plus or minus a certain distance on either side of the centerline 118, e.g. (+/−) 25% on either side. Further, the center 136 or centerband of the receiver panel 112 may include the centerline 118 (i.e. the actual center) of the panel 112, but may also be shifted up or down by any suitable amount to include a generally central portion 134 of the panel 112. For example, the center portion 134 of the receiver panel 112 may encompass the center 136 of the receiver panel 112 along a length thereof plus or minus (+/−) more or less than 25% on either side as mentioned in the previous example. Further, the center portion 134 (or centerband) of the receiver panel 112 may encompass the center 136 of the receiver panel 112 along a length thereof plus or minus a first distance on one side of the centerline 118 and a different distance on an opposite side of the centerline 118.

More specifically, as shown in FIGS. 8-12 and 14-15, each receiver panel 112 of the solar receiver 106 may include at least four inlet headers 130 (or outlet headers) configured with the inlets 122 (or outlets 124) of the receiver tubes 114, wherein each of the four inlet headers 130 are configured in a center portion 134 of the receiver panel 112. In further embodiments, the receiver panel(s) 112 of the solar receiver 106 may include more than four or less than four inlet headers 130. Moreover, in certain embodiments, each of the receiver panel(s) 112 of the solar receiver 106 may include the same number or a different number of inlet headers 130. In addition, as shown, the inlet headers 130 may be arranged in any suitable configuration. For example, as shown in FIGS. 8-12 and 14-15, the inlet headers 130 have a staggered configuration. In another embodiment, the inlet headers 130 may have an aligned configuration.

In further embodiments, as shown in FIGS. 7-11, the outlet header(s) 132 may be configured at one or more of the ends 138, 140 of the receiver panel 112. For example, as shown, each receiver panel 112 may include at least two outlet headers 132 configured with the outlets 124 of the plurality of receiver tubes 112, wherein the two outlet headers 132 are configured at opposing ends 138, 140 of the receiver panel 112. Further, as described herein, the inlet headers 130 and the outlet headers 132 may be interchangeable depending on whether the fluid flow is converging or diverging.

Figure 12:
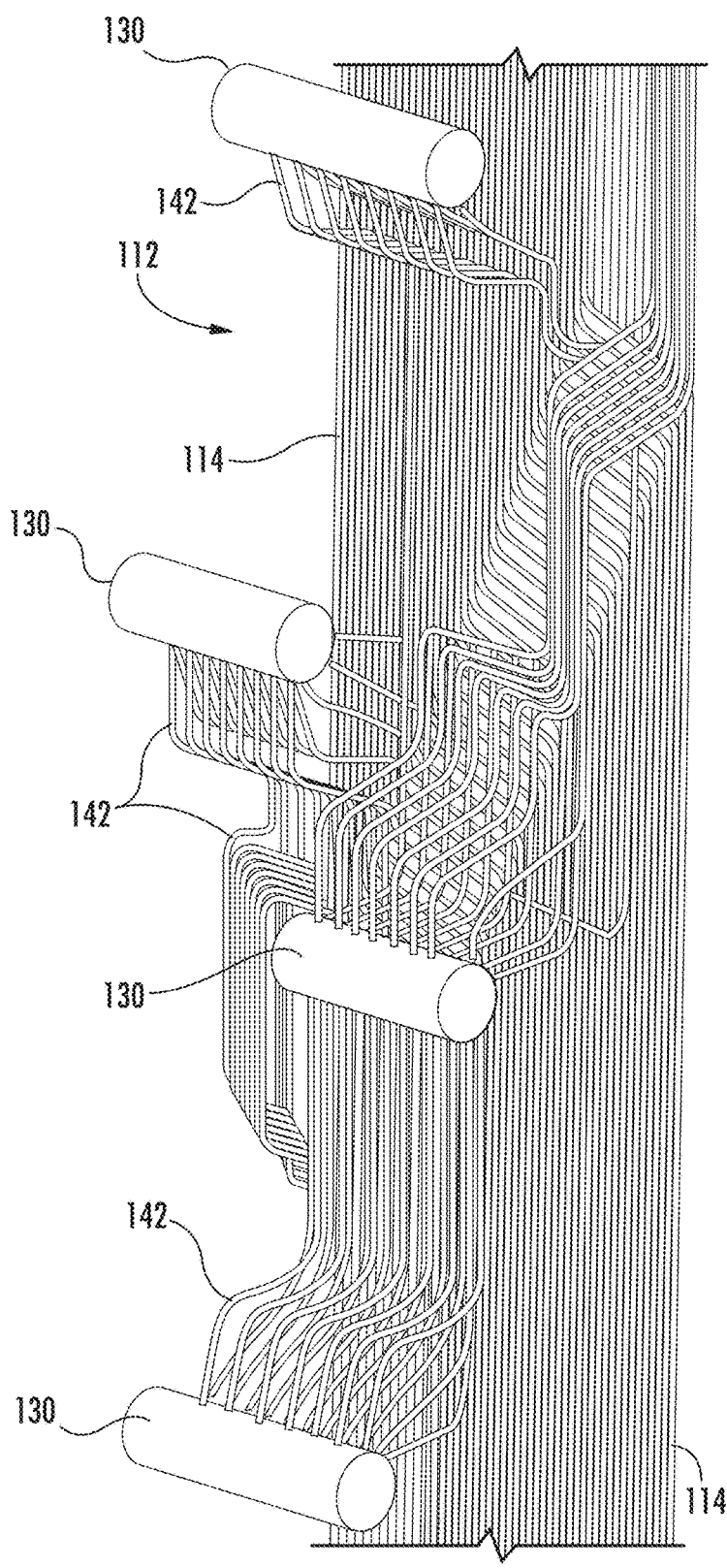
FIG. 12 illustrates a detailed, perspective view of the receiver panel of FIG. 10, particularly illustrating headers configured around the center of the panel along the height thereof.
Figure 13:
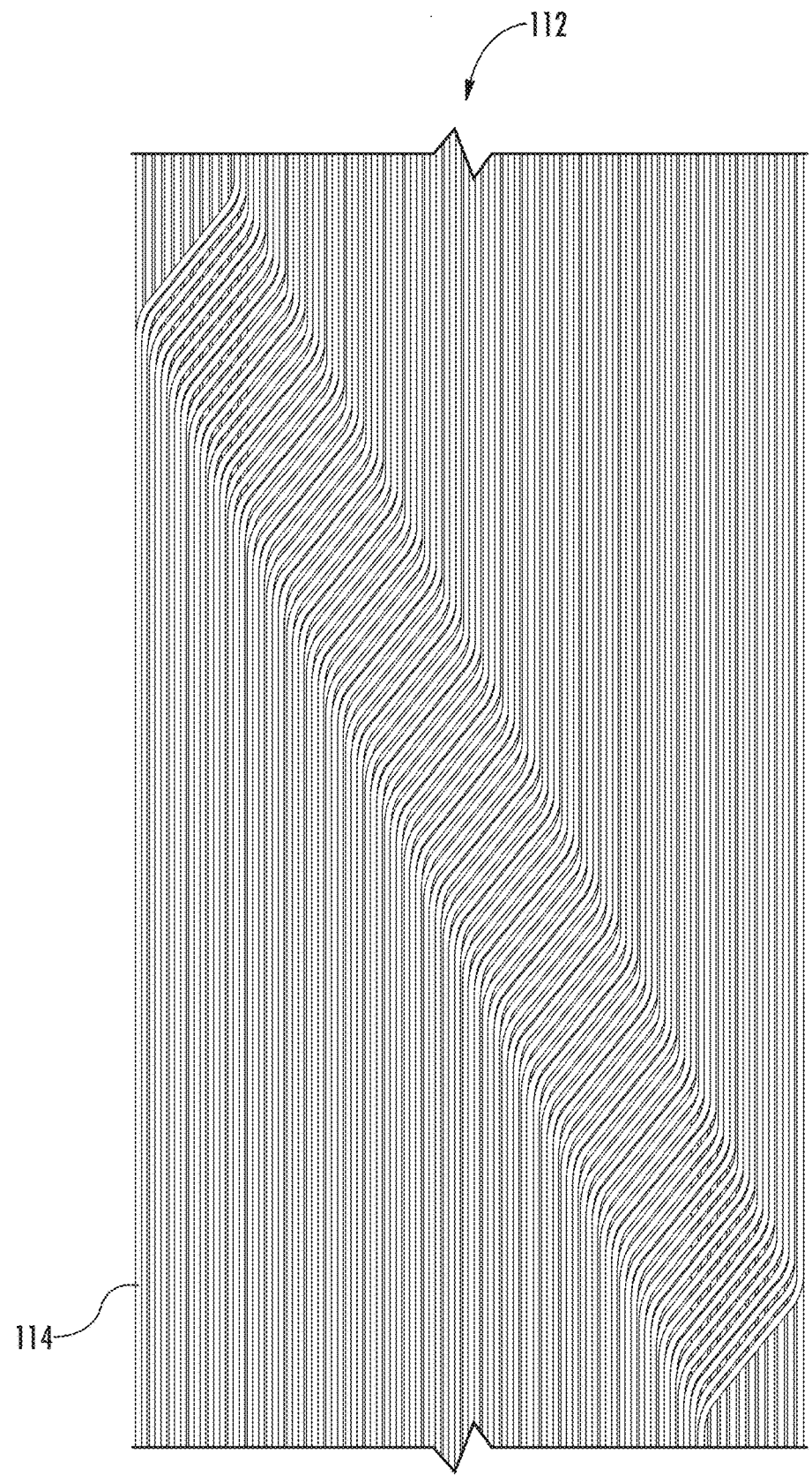
FIG. 13 illustrates a detailed, front view of the receiver panel of FIG. 7, particularly illustrating the tube arrangement around the center of the panel along the height thereof.
Figure 14:
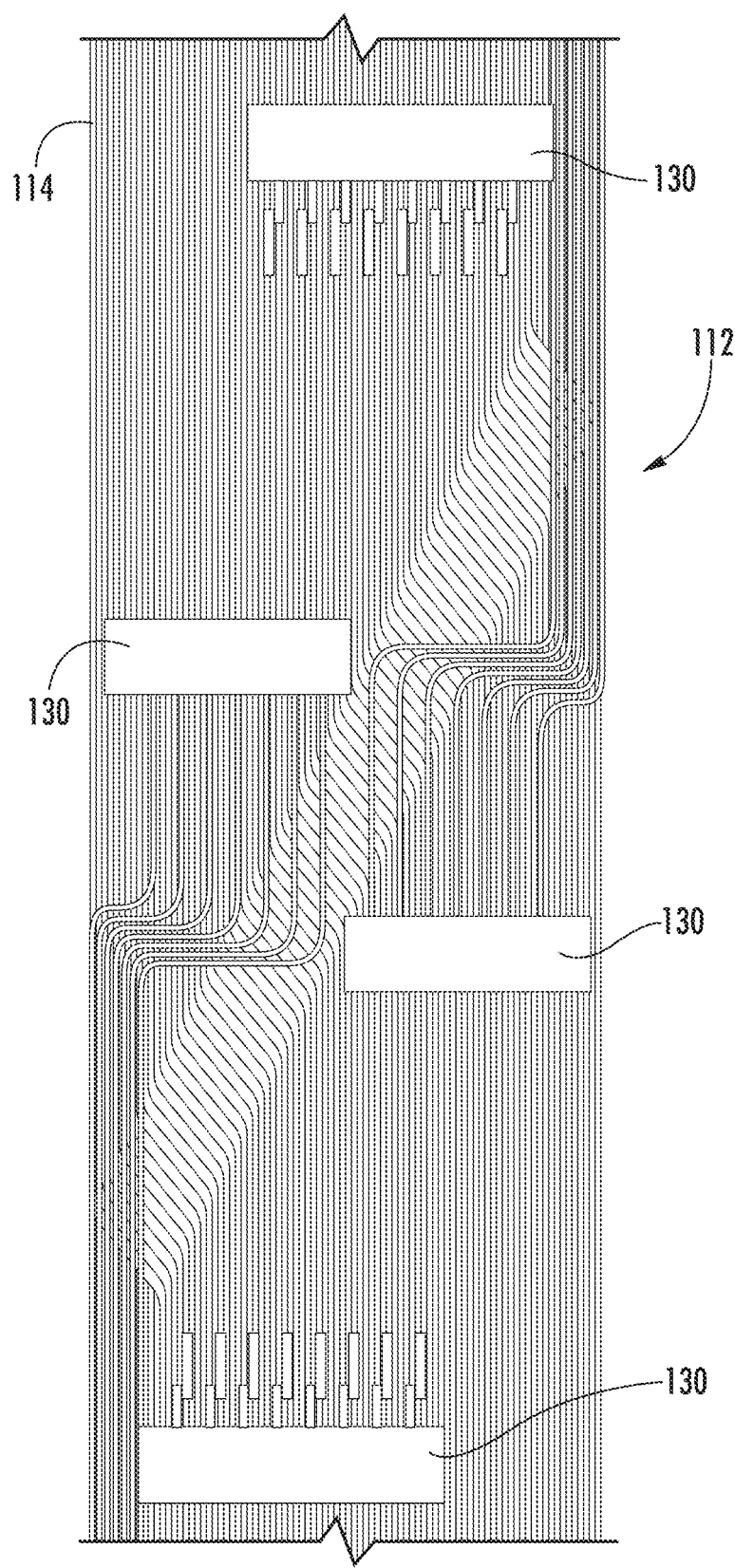
FIG. 14 illustrates a detailed, back view of the receiver panel of FIG. 9, particularly illustrating headers configured around the center of the panel along the height thereof.
Figure 15:
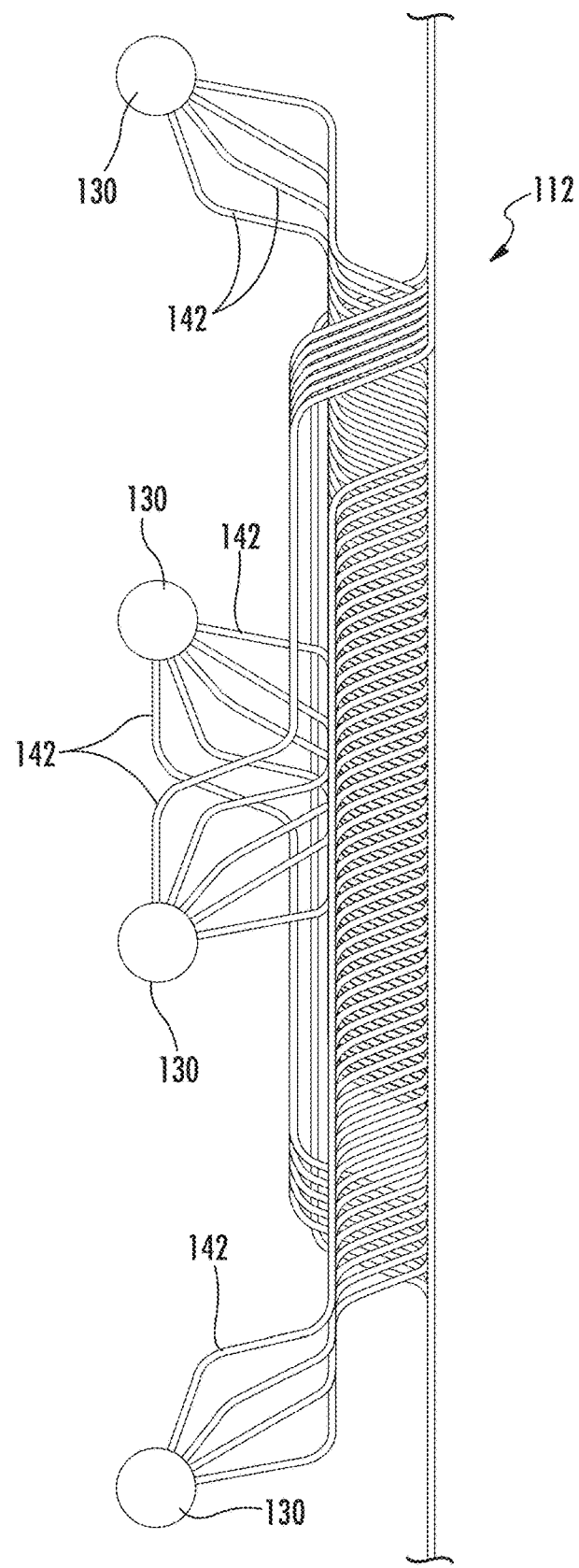
FIG. 15 illustrates a detailed, side view of the receiver panel of FIG. 8, particularly illustrating headers configured around the center of the panel along the height thereof.

In yet another embodiment, the receiver panels 112 of the solar receiver 106 may include additional piping 142 configured with the plurality of receiver tubes 114. More specifically, as shown in FIGS. 12 and 15, at least a portion of the additional piping 142 may be external to the plurality of receiver panels 114. Such piping 142 is configured to connect the inlet and outlet headers 130, 132 to the inlets and outlets 122, 124 of the receiver tubes 114.

Accordingly, the panel arrangement of the present disclosure arranges the flow path of the heat transfer medium 128 in such a way, that the heat flux limits of the receiver panel 112 is closer to the heat flux incident on the solar receiver 106 with centerband aiming. This enables easier focusing and control of the heliostat field 110. It also increases the solar field efficiency as the spillage loss is substantially reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A solar receiver on a support tower that receives solar rays via a heliostat field, comprising:
   a plurality of receiver panels arranged adjacent to one another, each receiver panel comprising a plurality of receiver tubes, each of the plurality of receiver tubes defining a first terminal end and a second terminal end, each of the first terminal ends comprising an inlet and each of the second terminal ends defining an outlet,
   each receiver panel comprising a center portion forming a center band around the solar receiver and each receiver panel comprising an end portion,
   wherein at least one of the inlets or outlets of the plurality of receiver tubes are arranged at the center portion of the receiver panel along a height thereof and at least one of the inlets or outlets of the plurality of receiver tubes are arranged at the end portion edge of the receiver panel such that a flow of heat transfer medium within the receiver tubes is configured to diverge from the center portion or converge at the center portion.

2. The solar receiver of claim 1, wherein a flow direction of one or more of the inlets or outlets of the plurality of receiver tubes converges at the center of the receiver panel along a height thereof.

3. The solar receiver of claim 1, wherein a flow direction of one or more of the inlets or outlets of the plurality of receiver tubes diverges from the center of the receiver panel along a height thereof.

4. The solar receiver of claim 1, wherein the inlets of the plurality of receiver tubes are arranged at or around the center portion of the receiver panels along the height thereof to provide a heat flux limit corresponding to a heat flux profile having centerband aiming.

5. The solar receiver of claim 1, wherein each of the plurality of receiver panels are vent-able.

6. The solar receiver of claim 1, wherein each of the plurality of receiver panels are drainable.

7. The solar receiver of claim 1, wherein the plurality of receiver panels are arranged to define a continuous receiver surface configured to provide a heat flux limit corresponding to a heat flux profile having centerband aiming.

8. A receiver panel for a solar receiver on a support tower that receives solar rays via a heliostat field, comprising:
   a center portion forming a center band around the solar receiver;
   an end portion; and
   a plurality of receiver tubes arranged adjacent to one another, each of the plurality of receiver tubes defining a first terminal end and a second terminal end, each of the first terminal ends comprising an inlet and each of the second terminal ends defining an outlet,
   wherein at least one of the inlets or outlets of the plurality of receiver tubes are arranged at the center portion of the receiver panel along a height thereof and at least one of the inlets or outlets of the plurality of receiver tubes are arranged at the end portion edge of the receiver panel such that a flow of heat transfer medium within the receiver tubes is configured to diverge from the center portion or converge at the center portion.

9. The receiver panel of claim 8, wherein a flow direction of the inlets or outlets of the plurality of receiver tubes converges at the center portion of the receiver panel along a height thereof.

10. The receiver panel of claim 8, wherein a flow direction of the inlets or outlets of the plurality of receiver tubes diverges from the center portion of the receiver panel along a height thereof.

11. The receiver panel of claim 9, wherein each of the plurality of receiver panels are vent-able.

12. The receiver panel of claim 9, wherein each of the plurality of receiver panels are drainable.

13. The receiver panel of claim 9, wherein the receiver panel is arranged to define a continuous receiver surface configured to provide a heat flux limit corresponding to a heat flux profile having centerband aiming.

14. A solar power plant, comprising:
   a solar receiver on a support tower that receives solar rays via a heliostat field, the solar receiver comprising a plurality of receiver panels arranged adjacent to one another, each receiver panel comprising a plurality of receiver tubes, each of the plurality of receiver tubes defining a first terminal end and a second terminal end, each of the first terminal ends comprising an inlet and each of the second terminal ends defining an outlet, each receiver panel comprising a center portion forming a center band around the solar receiver and each receiver panel comprising an end portion,
   wherein at least one of the inlets or outlets of the plurality of receiver tubes are arranged at the center portion of the receiver panel along a height thereof and at least one of the inlets or outlets of the plurality of receiver tubes are arranged at the end portion edge of the receiver panel such that a flow of heat transfer medium within the receiver tubes is configured to diverge from the center portion or converge at the center portion; and
   the heliostat field comprising a plurality of heliostats configured to continuously reflect solar rays towards the plurality of receiver panels.

* * * * *